May 3, 1938.  G. E. MIRFIELD  2,116,405
METHOD OF AND APPARATUS FOR WELDING PIPE
Filed Nov. 15, 1935
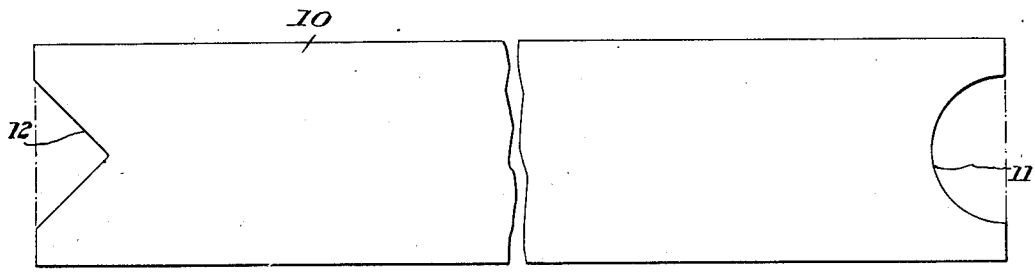
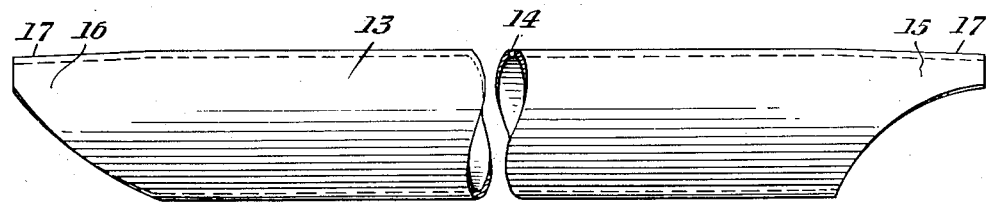
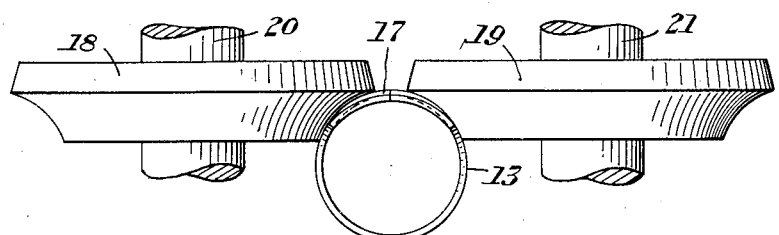
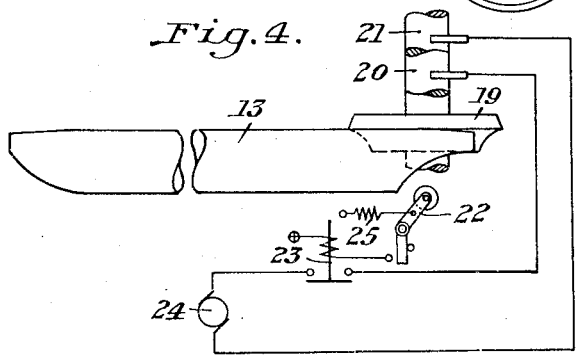
INVENTOR
George E. Mirfield
by his attorneys
Stebbins, Blenko & Parmelee Patented May 3, 1938

2,116,405

UNITED STATES PATENT OFFICE 2,116,405

METHOD OF AND APPARATUS FOR WELDING PIPE

George E. Mirfield, Youngstown, Ohio, assignor to The Youngstown Sheet & Tube Company, Youngstown, Ohio, a corporation of Ohio Application November 15, 1935, Serial No. 49,937

9 Claims. (Cl. 219—6)

This invention relates to the manufacture of pipe by welding and, in particular, to the manufacture of blanks for completion by electric welding, although the invention is applicable also to the actual welding operation.

This is a continuation-in-part of my copending application Serial No. 712,917, filed Feb. 26, 1934 (now Patent No. 2,079,916, dated May 11, 1937).

It is customary in the manufacture of pipe by electric welding to form flat plate or skelp into cylindrical blanks having a longitudinally extending seam cleft, and then forward the blanks through a welding throat formed in part by a rotary electrode. In the formation of pipe blanks, the ends assume a somewhat flaring shape instead of being truly cylindrical, as is the body of the blank intermediate the ends. This is highly objectionable. During the welding it is necessary that the electrode exert a certain pressure on the blank. After the edges of the seam cleft have been heated by the commencement of the welding, this pressure is relieved slightly from its initial value when the cold leading end of the blank enters the throat. This condition of high initial pressure is aggravated by the somewhat flaring shape of the leading end of the blank, as a result of which the blank entering the throat, unless great care is taken, may cause serious injury to the electrode by denting, scarring, or otherwise deforming it. For a good welding operation, of course, a smooth electrode is necessary to insure the desired contact with the edges of the seam cleft. The trailing end of the blank, although not so likely to injure the electrode, does subject the entire apparatus to considerable shock because of the flared condition thereof.

In the welding of pipe blanks of any considerable size, the matter of end scrap loss is of utmost importance. This refers to the fact that the seam cleft does not weld tightly adjacent the leading end of the blank because some time is required to heat up the edges to welding temperature and the blank moves forward continuously during this time. In the resistance welding of pipe, furthermore, some of the welding current flows around the body of the blank instead of across the seam. This reduces the amount of energy available for heating the seam and causes a longer time to be required to bring the edges to welding heat.

Various expedients have been proposed, in order to avoid the injury to the electrode by the entering blank, referred to above. According to one of these, the pressure rolls which cooperate with the electrode to form the welding throat are retracted, thus permitting the leading end of the blank to sag below its normal position, and thereby pass the electrode without striking it, the pressure rolls being subsequently closed to raise the blank into engagement with the electrode. This practice is objectionable because it is apt to introduce variations into the size of the finished pipe. It is desirable that the welding throat remain firmly fixed at all times to prevent such variations.

I have invented a method of forming blanks for welding which compensates for the tendency of the ends of the blanks to flare, and actually provides a tapering conformation to the blank ends. In accordance with the invention, I cut out or notch the ends of the skelp before bending it into a cylinder. This also has the effect of lengthening the back path around the body of the blank at its ends, which would have to be traversed by welding current not crossing the seam, and because of the greater resistance of such path, the amount of back current is reduced. As a result of concentrating at the seam, the greater proportion of the current delivered to the blank, the weld commences closer to the leading end of the blank than would otherwise be the case, reducing the amount of end scrap loss.

Referring to the drawing for an illustration of a present preferred practice of the invention, Figure 1 shows a piece of skelp treated in accordance with the invention, preparatory to bending;

Figure 2 is a side elevation of a blank after bending;

Figure 3 is a diagrammatic end view of the blank entering the welding throat, showing only the electrode rolls forming part thereof; and Figure 4 is a diagrammatic illustration showing another application of the invention.

Considering the drawing in detail, a piece of skelp 10 of generally rectangular shape (as indicated by the dotted lines), and being considerably longer than it is wide, has one or both ends cut out or notched as shown at 11 and 12. The notched or cut-out skelp is then subjected to bending so that its longer sides are brought around toward each other, the body of the resulting blank 13, as shown in Fig. 2, being substantially a true cylinder with a longitudinal seam cleft 14 therein. The end portions 15 and 16 of the blank, however, are not cylindrical but have a slight taper, as shown at 17. In other words, the ends of the blank actually bend downward from the level of the seam cleft edges throughout the body portion of the blank. This results from the removal of the metal opposite the seam cleft at the blank ends where notched or cut out. Figure 1 shows two alternative shapes of notches or cut-outs. The particular shape is not important, although the depth of the notch is. In making pipe with an inside diameter of 8¾" and with a wall thickness of ¼", the skelp is approximately 27" wide and the depth of the cut-out is 9". The cut-out 12 is simply an isosceles right triangle, while the cut-out 11 is a semi-circle. The depth of the notch or cut-out should be in proportion to the thickness of the plate. As previously stated, other shapes of notches or cut-outs may be used.

The tapering shape of the ends of the blank of Figure 2 make it possible for the blank to enter and leave the welding throat without injury to the electrode or dangerous shock to the other parts of the throat. It will be observed that the difference in elevation between the ends of the blank and the body portion thereof is about equal to the thickness of the blank wall. This amount of clearance appears to be ample to preserve the electrode from denting and the other parts of the throat from shock as the blank passes out of it.

Cutting out the leading end of the blank opposite the seam cleft also has another advantage, which has been mentioned briefly. The path of the back current is thereby lengthened during the initiation of the weld. A greater proportion of the current is thus concentrated at the seam and results in more rapid heating and welding at the edges.

Figure 3, showing electrodes 18 and 19 mounted for rotation on shafts 20 and 21, gives an idea of the clearance between the leading end of the blank and the peripheries of the electrodes. The other elements of the welding throat, such as the pressure rolls, and the means for delivering current to the electrodes, are omitted since they do not concern the present invention directly.

Figure 4 shows another use for the notches in the ends of the blank. Figure 4 shows a flag switch 22 adapted to be operated when the blank is entering the welding throat. By reason of the notch 11 in the leading end, however, the flag switch is not closed until the leading end has passed through the throat. When the switch is actuated, it completes an obvious energizing circuit for the operating magnet of a switch 23, connecting a generator 24 to the electrodes 18 and 19, the connections being made through brushes engaging the shafts 20 and 21. The welding current is thus delivered to the electrodes only after the blank has been properly entered in the throat. Likewise, the notch 12 at the trailing end of the blank permits the resetting spring 25 to open the flag switch before the trailing end of the blank actually leaves the electrode. This prevents arcing and burning of the electrode.

It will be apparent that the invention is characterized by numerous advantages and features of utility which have been fully pointed out and need no further mention here. Although only one practice of the invention has been described and illustrated, changes therein may be made without departing from the spirit of the invention or the scope of the appended claims.

I claim:

1. In a method of making a tubular pipe blank having a longitudinal seam cleft adapted to be welded, the steps including notching the end of a piece of skelp adjacent the midpoint of its width and bending it into cylindrical form.

2. In a method of forming a tube blank, the steps including bending a rectangular metal piece into a cylinder after notching one of its end edges adapted to form the end of the blank.

3. In a method of forming a tube blank having a tapering end, the steps including forming a cut-out in an end of an elongated metal plate spaced from the side edges thereof and bending the side edges toward each other to form a cylinder, whereby the cut-out end of the resulting blank assumes a slight taper.

4. A tube blank adapted for entry into a constricted welding throat comprising a metal cylinder having a longitudinal seam cleft, the end of the cylinder being cut away at a point diametrically opposite the cleft.

5. In the method of making pipe, the steps including forming a pipe blank having a longitudinal seam cleft, passing electric current across said cleft and pressing the edges thereof together to weld them, and forming a cut-out in one end of the blank at a point spaced from the cleft before commencing the welding to limit the current flowing around the body of the blank adjacent said end thereof.

6. The method of claim 3, characterized by giving said cut-out a depth of the order of the diameter of the blank to be formed.

7. In an electric welder, contact electrodes, a flag switch adapted to be engaged by material advancing toward the electrodes, means controlled by the flag switch for supplying welding current to the electrodes, the trailing end of the material being welded having a cutout formed therein and alined with said switch so as to permit return movement of said flag switch before the trailing end of the material passes away from the electrodes.

8. A tube blank adapted to be progressively welded along a longitudinal seam, comprising a flat plate bent to cylindrical form and having a cutout adjacent one end and spaced from the side edges of the plate.

9. In an electric welder, contact electrodes, means adapted to be actuated by material advancing toward the electrodes, means controlled by said first-mentioned means for supplying welding current to the electrodes, the trailing end of the material being welded having a cutout formed therein in alignment with said first-mentioned means to cause termination of the supply of welding current before the trailing end of the material passes away from the electrodes.

GEORGE E. MIRFIELD.